G. H. CURTISS AND H. KLECKLER.
FUEL SUPPLY SYSTEM FOR AIRCRAFT AND SIMILAR APPARATUS.
APPLICATION FILED JULY 17, 1920.

1,386,846.

Patented Aug. 9, 1921.
3 SHEETS—SHEET 2.

Inventors
GLENN H. CURTISS AND
HENRY KLECKLER.
By their Attorney

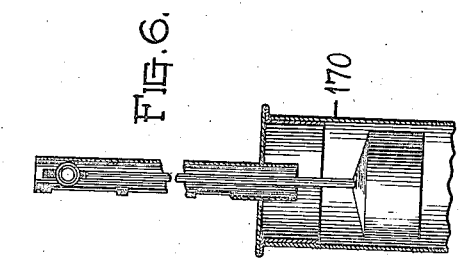
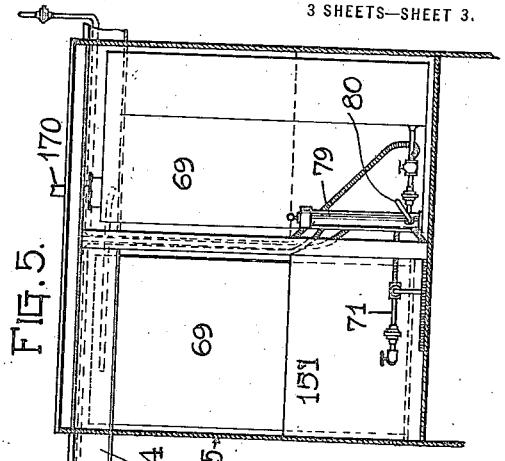
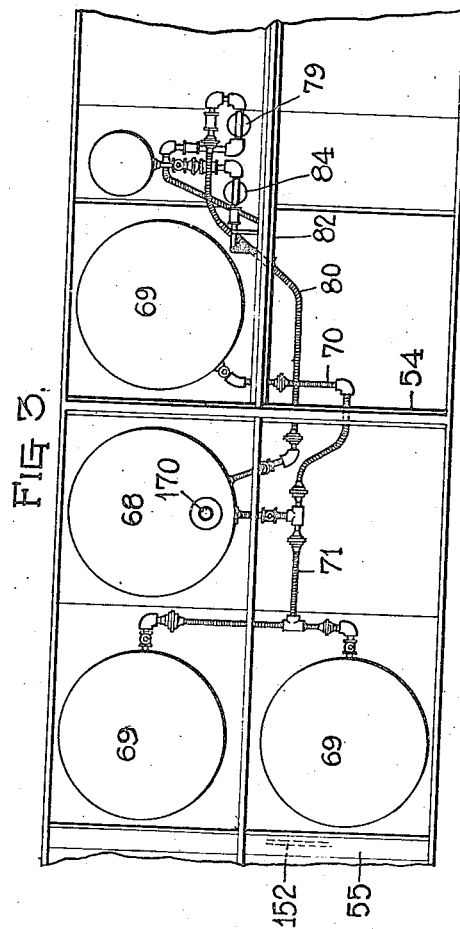
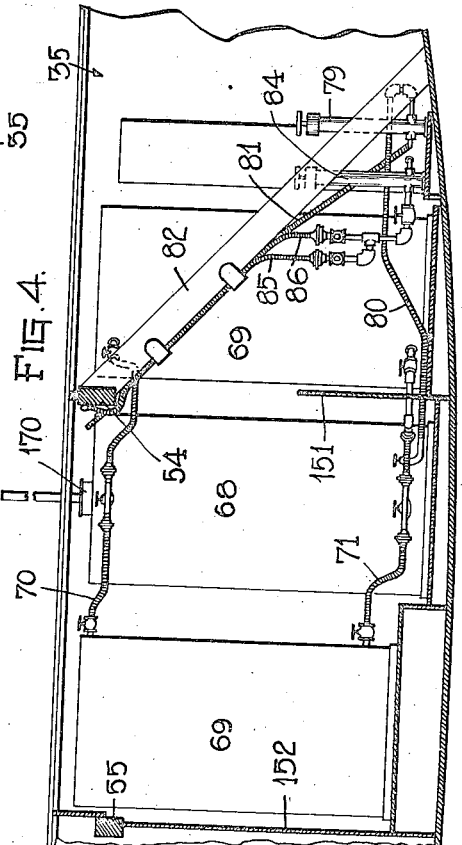

UNITED STATES PATENT OFFICE.

GLENN H. CURTISS, OF GARDEN CITY, AND HENRY KLECKLER, OF HAMMONDSPORT, NEW YORK, ASSIGNORS TO CURTISS AEROPLANE AND MOTOR CORPORATION, OF GARDEN CITY, NEW YORK, A CORPORATION OF NEW YORK.

FUEL-SUPPLY SYSTEM FOR AIRCRAFT AND SIMILAR APPARATUS.

1,386,846.
Specification of Letters Patent.
Patented Aug. 9, 1921.

Original application filed December 23, 1916, Serial No. 138,633. Divided and this application filed July 17, 1920. Serial No. 397,092.

*To all whom it may concern:*

Be it known that GLENN H. CURTISS and HENRY KLECKLER, citizens of the United States, residing, respectively, at Garden City, in the county of Nassau, State of New York, and Hammondsport, county of Steuben, State of New York, have invented certain new and useful Improvements in Fuel-Supply Systems for Aircraft and Similar Apparatus, of which the following is a specification.

This invention is a division of application Serial Number 138,633 filed December 23rd, 1916. The invention relates to improvements in fuel supply systems for aircraft and similar apparatus and more particularly to apparatus including a motor, a motive fuel service tank, supply tanks, the base end of each of which is elevated above the corresponding end of the service tank, a gravity feed line connection between the supply tank (or tanks) and the service tank, a gravity tank elevated above the motor, and a connection between the service tank and the gravity tank for continuously elevating fuel to the gravity tank during motor operation. From such an arrangement adequate fuel supply to the motor under all operating conditions is assured. Moreover, where the several tanks are collectively grouped about the center of gravity of the apparatus, the major item of variable or exhaustible load is so related to the apparatus in its entirety that little or no disturbance in balance is brought about by partial or total fuel consumption.

Figure 1:
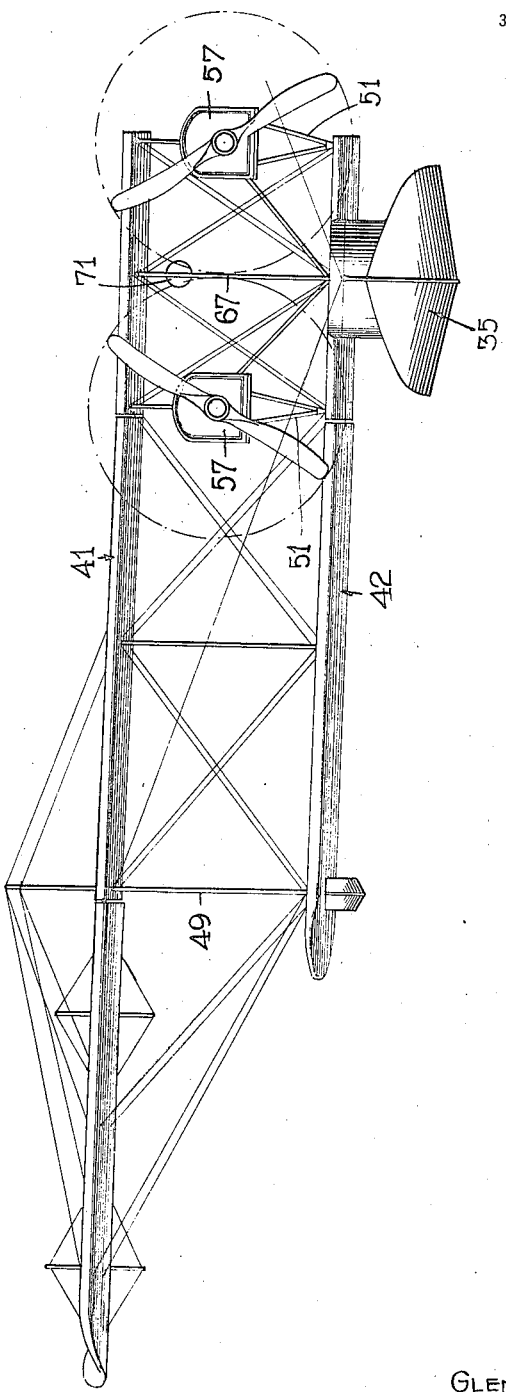
Figure 2:
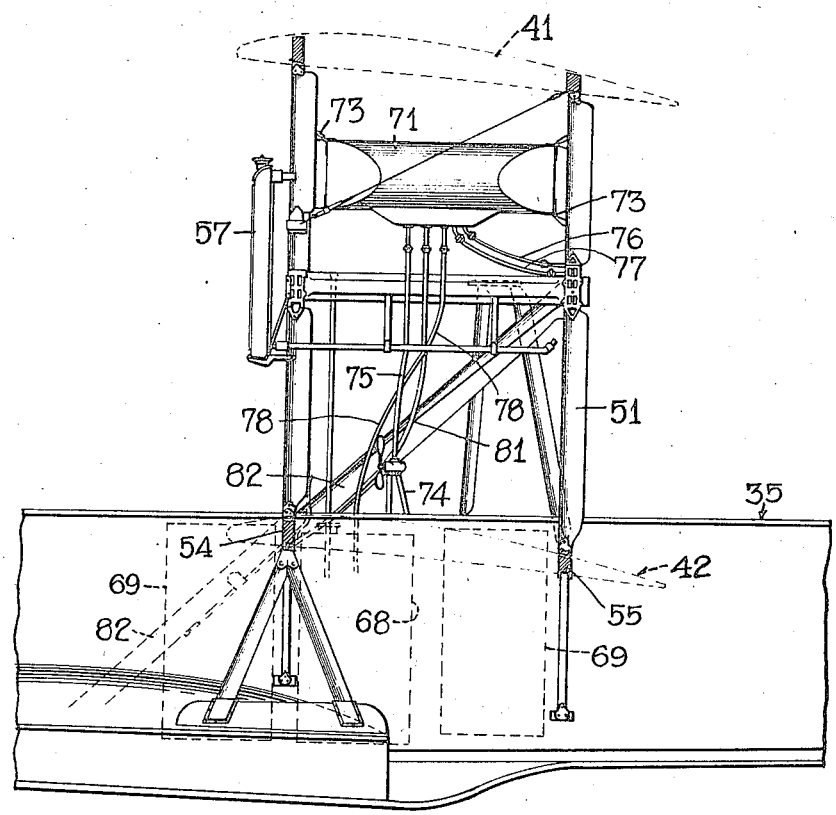

In the drawings, wherein like characteristics of reference designate like or corresponding parts, Figure 1 is a front end elevation (with a portion of the wings of the apparatus removed) of a flying boat embodying the improved fuel supply system hereinafter more fully disclosed, Fig. 2 is a side elevation of the engine section of the aircraft or apparatus showing the relative arrangement of the supply tanks, the service tank, the gravity tank and the several feed line connections, Fig. 3 is a plan view of the mid section of the flying boat hull illustrating the motive fuel tank arrangement, Fig. 4 is a longitudinal sectional view of that portion of the hull illustrated in Fig. 3, Fig. 5 is a transverse section of the hull, and Fig. 6 is a detail section of the gasolene gage.

As the structural relation of the various parts of the flying boat *per se* have nothing whatever to do with the invention, only a brief description of the boat as a whole will be given. Suffice it to say that the flying boat illustrated in Fig. 1 is of more or less conventional design. It comprises upper and lower supporting surfaces 41 and 42, interplane wing struts 49, a hull 35, motors 57, and suitable motor supports or wing post frames 51. Preferably the motors are situated between the supporting surfaces respectively symmetrically at opposite sides of the longitudinal vertical plane of the fore and aft axis of the hull.

The motive fluid tanks (the number of which may be varied) for the propelling power plant are located preferably interiorly of the hull substantially symmetrically about the vertical plane of the center of gravity. These tanks (see Figs. 2 to 5 inclusive) include a service tank 68 and a plural number of supply tanks for connection with the service tank 68 by upper and lower pipe lines 70 and 71. The upper pipe line 70 need only be used when the tanks are constructed air tight. The service tank 68, or rather its bottom end, is located or disposed in a horizontal plane somewhat below the horizontal plane of each corresponding end of the several supply tanks 69. By this arrangement a gravity fuel feed from the supply tank to the service tank is obtained.

Above the horizontal plane of the power units 57 a gravity feed tank 71 of appropriate streamline form is either suspended or supported. In the embodiment of the invention selected for illustration the center wing struts 67 provide a support for this tank, the ends of the tank having connections indicated at 73 with said post.

Upon the top of the service tank 68 the fan pump 74 is mounted. The fan of the pump is located without the hull and in the line of air rush, the pump in its entirety being founded upon and removable with the tank. From the tank 68 by way of the pump 74 and a lead 75 connecting said pump to the gravity tank 72, fuel is conveyed to the gravity tank continuously during motor operation. From the tank 72 by way of leads 76 and 77, the fuel is carried by gravity to the respective motors or power units. The overflow of the tank 72 is taken care of by lead 78 inter-connecting said tank 72 and the service tank.

As an auxiliary, fuel may be pumped from the service tank 68, by hand, to the gravity tank 72. To this end the hand pump 79 and leads 80 and 81 are provided. Through operation of the hand pump, fuel is drawn from the service tank and conveyed by way of the leads 80 and 81 to the tank 72. Said lead 81, throughout a portion of its length, underlies a diagonal brace 82 for the engine section. This brace, as illustrated in Fig. 2, comprises substantially alined sections arranged to extend respectively from the rear center wing strut 67 in the horizontal plane of the engine base forwardly of the panel beam 54 equidistant from its ends, and from said panel beam forwardly for anchorage interiorly of the hull above its hydroplaning bottom. The tanks, it will be noted, underlie said brace 82 throughout the major portion of its length, and where the brace extends into the hull the tanks are grouped about it.

Interiorly the hull 35 is divided transversely by bulkheads 151 and 152, the bulkhead 151 underlying the forward wing beam 54 of the engine section, and the bulkhead 152 underlying the rear wing beam 55 thereof. Three cockpits are thus provided. The forward cockpit is designed to accommodate a portion of the flying crew and one or more of the motive fluid tanks, the intermediate cockpit is designed to accommodate the bulk of variable or exhaustible load, and the rear cockpit is designed to accommodate the pilot. The entire load is thus distributed symmetrically about the center of gravity of the apparatus with the variable load in the immediate vicinity of the vertical plane thereof. The arrangement of the tanks is such that the occupant of the forward cockpit, should occasion demand, may gain access to any one or more of the tanks conveniently, as it will be noted in Fig. 3 that an aisle or passageway is formed at one side of the two forwardly located tanks, the aisle or passageway being situated at one side of the fore and aft centerline of the hull or body.

In Fig. 6 is illustrated a float actuated gage 170 for the service tank 68. At one end it is extended without the hull of the craft so that it can be conveniently viewed from the rear cockpit of the boat. If desired, any other suitable type of gage may be substituted.

In conclusion it may be noted that the fuel supply system herein disclosed is adaptable to any and all types of aircraft or similar apparatus and that the system is in no wise limited to its use on flying boats. The manner in which the gravity tank is supported, as well as the remaining number of tanks and motors, is immaterial, the arrangement of the tanks and motors with respect to the hull or body and with respect to each other is, however, important. The extent to which the system may be modified without departing from the spirit of the invention may be determined or ascertained by reference to the claims.

What is claimed is:

1. In an apparatus of the type set forth, the combination of a framework, a motor, a motive fuel service tank carried by the framework, supply tanks likewise carried by the framework, the base end of each supply tank being elevated above the corresponding end of the service tank, a gravity feed line connecting the supply tanks with the service tank, a gravity tank elevated above the motor, and a connection between the service tank and the gravity tank for continuously elevating fuel to the gravity tank during operation of the motor.

2. In an apparatus of the type set forth, the combination of a framework, a motor, a motive fuel service tank carried by the framework, supply tanks likewise carried by the framework, the base end of each supply tank being elevated above the corresponding end of the service tank and the tanks collectively being situated in the vicinity of a line passing through the center of gravity of the apparatus, a gravity feed line connecting the supply tanks with the service tank, a gravity tank elevated above the motor, and a connection between the service tank and the gravity tank for continuously elevating fuel to the gravity tank during operation of the motor.

3. In an apparatus of the type set forth, the combination of a framework, a motor, a motive fuel service tank, carried by the framework, supply tanks likewise carried by the framework, the base end of each supply tank being elevated above the corresponding end of the service tank and the tanks collectively being situated in the vicinity of a line passing vertically through the center of gravity of the apparatus, a gravity feed line connecting the supply tanks with the service tank, a gravity tank elevated above the motor, and a connection between the service tank and the gravity tank for continuously elevating fuel to the gravity tank during operation of the motor.

In testimony whereof we hereunto affix our signatures.

GLENN H. CURTISS.
HENRY KLECKLER.